United States Patent [19]

Salzmann

[11] Patent Number: 5,186,137
[45] Date of Patent: Feb. 16, 1993

[54] ROCKING-PISTON MACHINE

[76] Inventor: Willy E. Salzmann, Schönegg 7, 6300 Zug, Switzerland

[21] Appl. No.: 747,434

[22] PCT Filed: Feb. 29, 1988

[86] PCT No.: PCT/CH88/00050
§ 371 Date: Dec. 27, 1988
§ 102(e) Date: Dec. 27, 1988

[87] PCT Pub. No.: WO88/06675
PCT Pub. Date: Sep. 7, 1988

Related U.S. Application Data

[63] Continuation of Ser. No. 659,540, Feb. 22, 1991, abandoned, which is a continuation of Ser. No. 302,234, Dec. 27, 1988, abandoned.

[30] Foreign Application Priority Data

Feb. 27, 1987 [CH] Switzerland ............ 744/87-3
Oct. 26, 1987 [CH] Switzerland ............ 4174/87-8

[51] Int. Cl.$^5$ ............................................. F02B 75/06
[52] U.S. Cl. ............................. 123/192.2; 123/48 A
[58] Field of Search ............... 123/48 A, 65 B, 78 A, 123/81 C, 81 D, 188.5, 192.2, 193.6, 197.1, 197.2, 197.3, 317; 74/579 E, 589, 590, 603; 91/394, 402, 404; 417/203, 244, 489

[56] References Cited

U.S. PATENT DOCUMENTS

| 1,437,929 | 12/1922 | Brockway | 123/48 A |
| 1,680,710 | 8/1928 | Wall | 123/48 A |
| 1,795,551 | 3/1931 | Geisse | 123/73 A |

FOREIGN PATENT DOCUMENTS 2132021 11/1972 France.
2139206 1/1973 France.
322372 9/1966 Sweden.
2135385 8/1985 United Kingdom.

OTHER PUBLICATIONS

"Rocking Piston Engine", IMechE 1976 Automotive Engineer, pp. 53-54.
Automobil Revue, Adiabatischer Ford-Dieselmotor: Ohne Ol und Kuhlung, NR 31, Jul. 31, 1986.
Automotive Engineer, "MCC: A New Engine-A New Concept", Feb. Mar. 1988, pp. 68, 69, 71.

Primary Examiner—Noah P. Kamen
Attorney, Agent, or Firm—Browdy and Neimark

[57] ABSTRACT

A reciprocating rocking-piston two-cycle engine where the piston is skirtless, rigidly mounted to its connecting rod, and slides up and down in a preferably waisted cylinder is shown and described. The free and of the connecting rod is laid out as an adjusted counterweight to assure smooth running of the rocking piston. An exhaust slide runs on a frontal cylinder wall and is hinged on the piston edge.

34 Claims, 3 Drawing Sheets

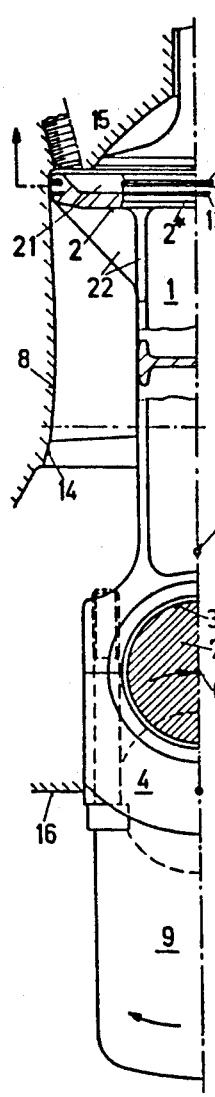
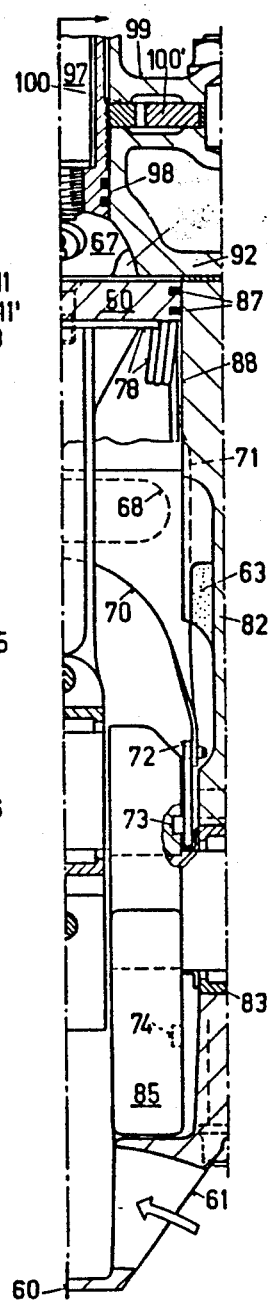
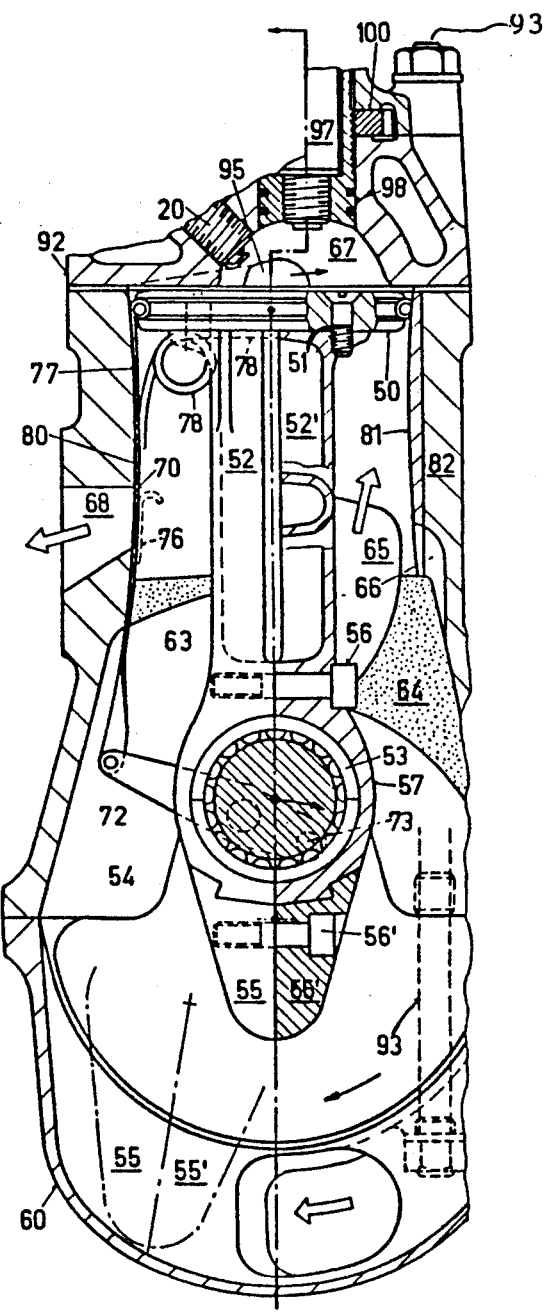
FIG. 1
FIG. 5
FIG. 6

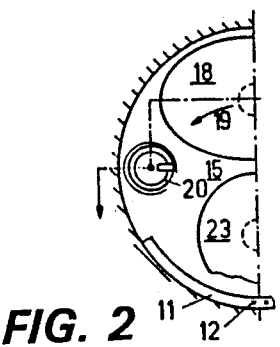
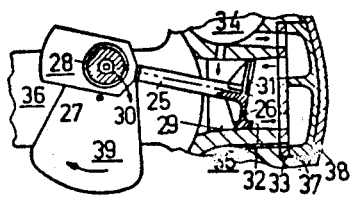
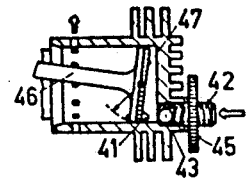
FIG. 2  FIG. 3  FIG. 4
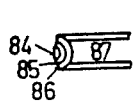 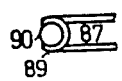 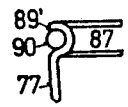 
FIG. 7  FIG. 8  FIG. 9  FIG. 10
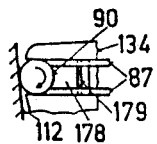  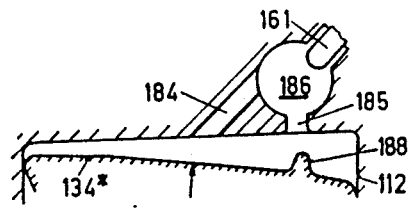
FIG. 13  FIG. 14  FIG. 15
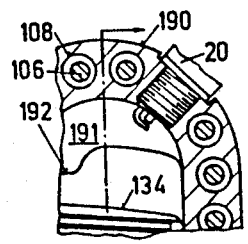 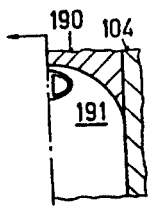
FIG. 16  FIG. 17

ROCKING-PISTON MACHINE

This application is a continuation of application Ser. No. 07/659,540 filed Feb. 22, 1991 which is a continuation of Ser. No. 07/302,234 filed Dec. 27, 1988, both abandoned.

BACKGROUND OF THE INVENTION

1. Field of the Invention

The present inventions improve, in the widest sense, the running characteristics of a rocking-piston machine, as described in United Kingdom Patent No. 7,555,066 of the same inventor, with at least one rocking piston integral with or solidly attached to a connecting rod, which is articulated to the crank pin bearing of a crankshaft, the piston reciprocating in a preferably waisted cylinder.

BRIEF SUMMARY OF THE INVENTION

The invention comprises a connecting rod that at the rod end opposite the piston side end and beyond the crank pin center carries a counterweight, the optimal layout of which provides nearly slap and friction-free running of the piston. If moreover, in the case of a quadrangular rocking piston, the connecting rod and the counterweight are designed equally as wide as the piston and if they are closely surrounded by cylinder and crankcase, then they form a volumetric "connecting rod charger", for example in combustion engines, that greatly improves the gas exchange, particularly in two-stroke engines. This leads to a novel high performance reciprocating piston machine of a most simple and compact construction that may additionally feature a novel cylinder head, permitting catalytic combustion without auxiliary piston, (Automotive Engineer, February/March 1988). A rocking-piston machine optimized in such a way and requiring only very basic maintenance is suitable at any scale, for example as automotive-, marine- and aircraft-engine, as well as for stationary and industrial purposes or for piston type gas compressors.

BRIEF DESCRIPTION OF THE DRAWINGS

FIG. 1 illustrates a four-stroke automotive engine in semi cross-section,

FIG. 2 illustrates an upper cylinder part of the engine, seen from below,

FIG. 3 shows a small refrigeration compressor in partial horizontal-section,

FIG. 4 shows a tiny scale model engine, in enlarged cross-section,

FIGS. 5 and 6 show a two-stroke automotive engine in semi longitudinal-section and in cross-section, respectively, FIGS. 7 to 10 show enlarged details of the piston edges of FIG. 6, FIG. 11 and 12 show a two-stroke automotive engine in cross-section and partial longitudinal-section, FIGS. 13 and 14 show enlarged details of a piston edge, FIG. 15 shows a variant of the cylinder head in cross-section and FIGS. 16 and 17 show a further variant of the cylinder head in partial cross- and longitudinal-sections. In all figures, the crankshaft rotates clockwise.

DETAILED DESCRIPTION OF THE PREFERRED EMBODIMENTS

Figures 11, 12:
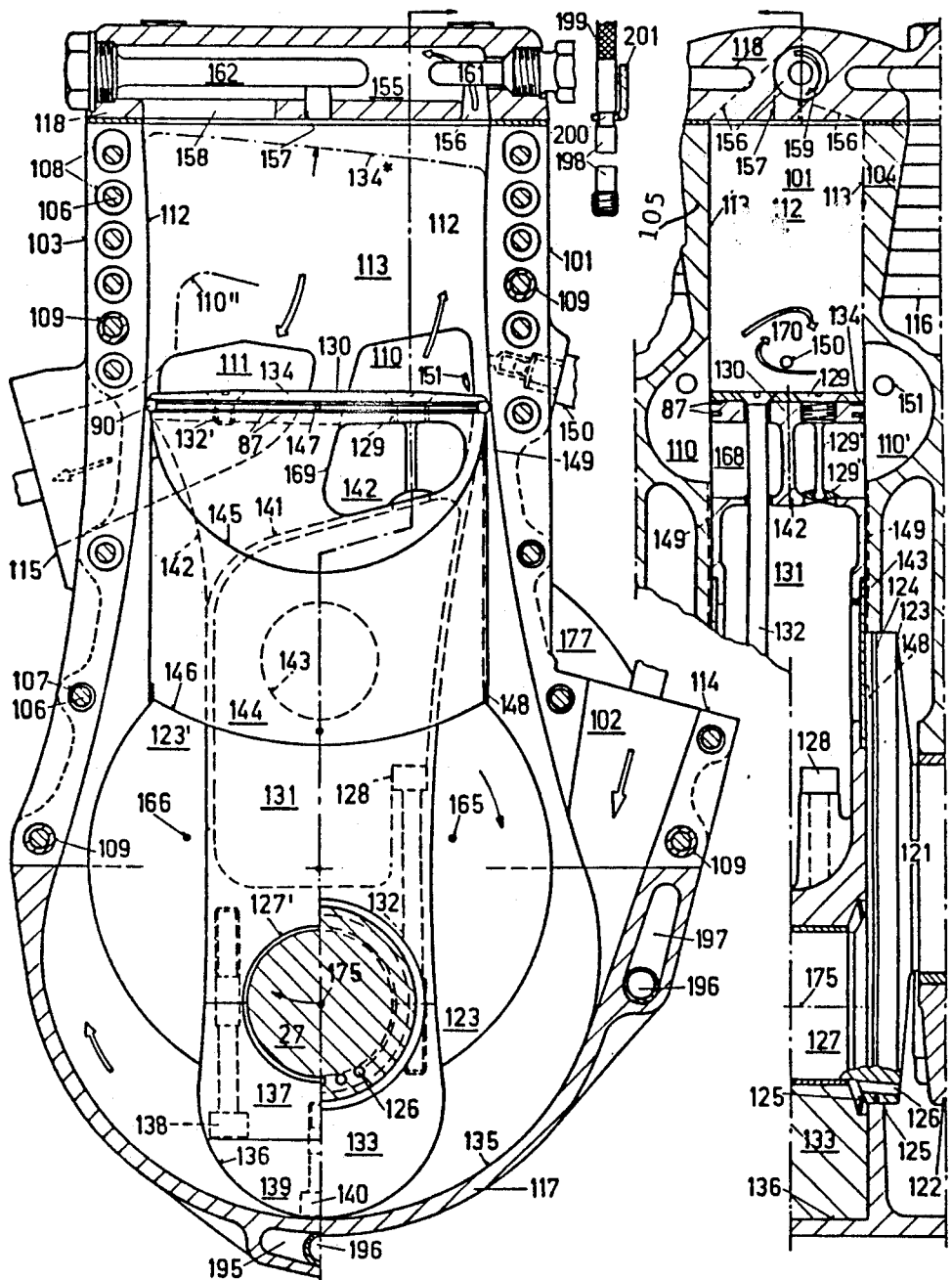

In the four-stroke automotive engine, as shown in FIGS. 1 and 2, the connecting rod 1 with integrated rocking piston 2 is articulated to the crank pin 7 of the engine crank shaft. The connecting rod bearing-cap carries a counterweight 4 integral with the cap, whereby the center of gravity 5 of this body 1–4 moves closer to the center 6 of the crank pin 7. By optimizing the layout of counterweight 4 with respect to mass and size, the dynamic lateral forces on the rocking piston 2, generated by mass inertia, can be reduced to a negligible value, i.e. the center 2* of the rocking piston moves at least substantially along a straight line. This is the case once the center 6 of the crank pin-bearing 3 coincides with the center of impact of the body 1–4 with regard to the rocking-piston center 2*, the latter being defined for example *[1]. If this body were a straight rod with constant cross-section, then its center of impact would be at two-third of its length, and that relative to the free end of the longer rod portion. Because, for the rocking piston, moreover, the piston seal is always perpendicular to the gas force, also in this respect no noteworthy lateral forces and therefore no piston-slap occur. The very small dynamic lateral forces, due to the motion of the piston center 2* on a long-drawn figure eight, are negligible, and

[1]* in the above mentioned prior patent to the present inventor. the reaction to the friction torque of the connecting rod-bearing is always pointing in the sense of rotation and does not cause any slap. The body 1–4 therefore rocks by itself about the piston center 2*, without the occurrence of noteworthy lateral forces between rocking piston 2 and waisted cylinder 8, i.e. the rocking piston floats within the cylinder. Thus, the body 1–4 may be termed a "floating piston". In addition, with suitably chosen crankshaft counterweight 9, an outstanding balancing of the masses is possible, even with a monocylinder layout. The almost slap-, vibration- and friction-free running of the floating piston opens new horizons to reciprocating piston machines.

Since the rocking piston has now been practically rid of harmful dynamic lateral forces, the piston rings are substantially relieved of their guiding functions. Therefore a narrow fire-ring with a domed head and open gap may be used. Still better is a double ring consisting of two identical sheet-steel rings 11/11', that are superposed with some offset (and hence overlapping) gaps and that are held together on diagonally opposite sides, e.g. by spot-, or electron-beam-welds 12 (FIG. 2).

Thus, gas sealing is improved and the double ring prevented from rotating (ring gaps run and seal better on flat, instead of waisted, cylinder surfaces). A third ring 13 (possible also a double sheet-steel ring, as per 11/11') is located in a deep groove, permitting substantial radial play and serving as oil-scraper ring and additional gas seal. Also gas- and oil-scraper-rings, as in the already cited United Kingdom Patent No. 7,555,066, are usable, however without hydrostatic piston guiding means. The rocking piston 2, including piston rings 11/13 and connecting rod 1, may be easily inserted and extracted from below, even with the crankshaft 'in situ'. Therefore, the cylinder head 15 may e.g. be an iron-, or light alloy-casting integral with the cylinder- and crank-casing 8/16, offering well-known advantages. The very short cylinder 8 with head 15 may be machined from below and if necessary sleeved, resulting in a compact monoblock-casing.

To make use of the rocking motion of piston 2 in the region of the top dead center, the cylinder head 15 is conceived as follows (see FIG. 2): at clockwise rotation of the crankshaft, the charge arrives from the right through a preferably elliptical intake valve 18, which together with the leading left edge of the rocking piston 2 produces a good charge and a strong intake swirl 19 in the direction of spark plug 20 (FIG. 2). This swirl continues during compression in the piston dish 21 and it is superimposed in the region of the top dead center, by the translation of the charge to the left (according to piston rock), resulting in an intensive mixture. Piston cooling is effected in part by freely moving (and thus not gumming) rings 11/11' and 13 and partly by the connecting rod 1 with supporting webs 22. Steel rocking pistons with welded-on tubular connecting rods, lend themselves easily for direct oil cooling. Furthermore, ceramic-coating of the piston dish 21 is feasible, and with diesel direct-injection advantageous. The exhaust takes place via the circular valve 23, in cross-, or uniflow manner.

In case production engines have to be equipped with rocking pistons in the simplest possible manner, it is mostly sufficient to machine-waist the cylinder and to fit a connecting rod with rocking piston and counterweight, for which the oilsump normally offers enough room. Thereby production change-over becomes relatively simple, particularly if the production engine has wet, interchangeable cylinder liners.

The variant as per FIGS. 1 and 2 is suitable for monocylinder-, inline- and V-engines. To increase the swept volume within the same overall dimensions, the circular rocking piston may be replaced e.g. by a square one, to which four valves in parallel, or in V-arrangement with a central spark plug, are a good match. Here the intake should come from the left and the cylinder machining criteria call for a separate cylinder head. This is also possible for large, slow- and medium-speed, two- or four-stroke engines.

Also in the crankdrive of the compressor in FIG. 3, the connecting rod 25 with the dieforged rocking piston 26 is extended beyond the crank pin-bearing 27 and forms the counterweight 28, that may e.g. consist of stamped-out strip steel and may be fastened to the connecting rod 25 by friction-welding. Fitting of this floating piston 25-28 is done through oblique introduction to the waisted cylinder 29 and over the upright crank pin 30 and fixation in known manner, by means of a bearing bush 27, consisting together with the piston ring 31 e.g. of PTFE. To increase the volumetric efficiency, the piston-crown may carry a cone 32, that meshes with the pressure-bore of valve plate 33. Cylinder 29 is part of a casting, comprising the suction- and pressure-chambers 34 and 35, as well as bearing plate 36. With hermetically sealed small compressors, this preassembled casting, together with cylinder cover 37 and asynchronous motor (not shown) is pressed into a pot-shaped and preferably cylindrical casing 38, that is welded tight by e.g. a base plate. The whole screw-less assembly is very cost-effective and made possible by the floating piston 25-28 and by the appropriate crankshaft counterweight 39, that ensures an outstanding balancing of masses, even with a monocylinder machine. This compressor can also be arranged as a multicylinder machine in V-2, or radial configuration, whereby the crank pin-bearings run stacked over each other on a prolonged crank pin, the cylinders being offset accordingly, such machines are suitable for e.g. heat pumps, or larger refrigeration installations. Lubrication takes place in known manner via oil, admixed to the refrigerant, whereby the extremely free running floating piston only requires very modest amounts of oils.

FIG. 4 shows in an enlarged sketch a $CO_2$ scale model engine, having a drastically reduced gas consumption and thus a manifold extended autonomy per $CO_2$-cartridge, compared to known $CO_2$ engines, due to the use of a floating piston. This, due to minimal friction-losses and to asymmetrical gas timing, achieved simply by a trigger pin 41, disposed at the trailing piston rim, acting on the superposed non-return valve of the gas admission. The later consists of a valve-sleeve 42, screwed into the cylinder head with a lower seat for the steel-, or thermoset-, valve-ball 43 and an upper thread for the cap-nut with O-ring of the pressure gas pipe. By screwing the valve-sleeve 42 in or out, by means of handwheel 45, the timing and thus the output of the micro-engine can precisely be controlled with only little deadvolume variations. With these tiny floating pistons 46 (and partly also with those of FIG. 3), straight instead of waisted cylinders are possible, however, the piston circumference 47 must ⎕⎕ ⎕⎕ be spherically shaped and it must e.g. be serrated, in order to prevent it from forming temporarily the sealing boundary, as otherwise lateral forces with piston-slap occur.

FIG. 5 shows a two-stroke automotive engine in semi longitudinal-section and FIG. 6 its cross-section, while FIGS. 7 to 10 show enlarged components of the piston edges in FIG. 6. This multifuel rocking-piston slide valve-engine is also destined in any configuration for various cylinder numbers and sizes. The nearly square rocking piston 50 is fixed by means of screws 51 to the connecting rod 52/52', consisting of two at least approximately identical shell-like halves, enclosing the crank pin-bearing 53 and carrying below, e.g. through a dove-tail 54, the counterweight 55/55', once the two fastening bolts 56 and 56' are tightened. This structure is light and cost-effective, resulting above all in a slim connecting rod-boss 57, that is only machined in the region of bolts 56/56'. The engine features a diaphragm-valve controlled crankcase-pump with additional scoop-charger, formed by the connecting rod-counterweight 55/55', the trajectory of which is closely hugged by the lower crankcase section 60 with one-, or both-sided diaphragm-valve port 61, causing, above all, the reed-valve intakes to be flung open already in the region of the bottom dead center. Admissive air is conducted by the aerodynamically shaped crankcase inserts 63, consisting e.g. of foam materials, to the lateral- and central-admission ducts 65 and 66, that are asymmetrically controlled by the rocking piston 50, resulting in thorough loop-scavenging. The rocking motion of piston 50 squeezes the admitted air subsequently to the combustion-chamber 67, from where the exhaust gases leave the cylinder again under asymmetrical timing through the frontal exhaust port 68. The nearly square cylinder cross-section reduces the interface between intake- and exhaust-gases to approximately 80% of that of an equal-surfaced circular cylinder. Instead of a piston skirt, the exhaust port 68 requires a slide valve 70, running in lateral grooves 71 of the cylinder and being actuated by lateral rockers 72 (or swingarms), whose gliding shoes 73 run in a curved path 74 in the crank webs. To simplify crankshaft assembly, cam-operated rocker-, or swing-arms are possible, they require however spring-loading. An exclusive slide valve operation, via hook follower 76 appears difficult on account of noise and wear. Alternatively, a slide valve 77/70 is hinged to the rocking piston 50, being guided by e.g. a hairpin-double spring 78, secured between the connecting rod-halves 52/52'. Instead of gliding on the waisted cylinder wall 80, the short slide valve 70 may glide between a separate waisted cylinder wall element 81 and the cylinder casing 82 and may then be flat and e.g. consist of fibre-reinforced ceramics. With adiabatic engines, the cylinder wall element 81, respectively the cylinder casing 82 also consist of ceramics, or are coated therewith and ceramic needle bearings 53 and 83 should permit oilless engine operation (Automobile Revue 31.07.1986). The quadrangular piston plate 50 consists also of (fibre-reinforced) ceramics and features preferably one of the following sealing elements. As per FIG. 7, on the front-faces, a semi-circular rod element 84, is retained to allow a rocking movement within a semi-circular groove formed by a cylindrical element 85 in the form of a ring sector, the latter being preferably retained in a second cylindrical element 86 also having the form of a ring second and being housed in a groove provided in the piston edge. The gas pressure rotates these elements relative to each other, so that they mostly seal with their lower edge toward the cylinder-wall 80/81. Element 86 is joined at 90° by two identical sealing strips 87, being pre-loaded by means of undulating springs, against the flat cylinder walls 88. FIG. 8 shows a variant, in which a needle 90 rotates inside a tube sector 89, reducing thus friction and wear and forming a double gas seal. FIG. 9 shows the same seal on the side of the exhaust slide valve 77, whose top end is rolled into a tube sector 89', within which again the needle (roller) 90 rotates. This is not the case in variant according to FIG. 10, but here the rolled rim 91 of slide valve 77 possesses increased longevity. For parts 84 to 87 and 89/90 ceramics may be used and, in case of need, for the slide valve 77 ceramic-coated chromium steel.

The separate cylinder head 92, as per FIGS. 5 and 6, may e.g. be oil-cooled and be made of cast-iron, or a light alloy. To relieve the ceramic casing from tensile forces, the cylinder head is fastened to the lower crankcase section 60 by long anchor bolts 93, passing partially outside the casing. The unilateral swirl duct 95 emerges tangentially into the, e.g. bowl-shaped, combustion-chamber 67, in the axis of which a pneumatic (air-assisted) injection nozzle 97 (OEC, Automotive Engineering, August 1986) is screwed within an adjustable piston 98. The latter is secured against rotation relative to the cover 99 by splines and is raised to decrease the compression ratio, by means of a gear 100, via threads. A similar spurgear 100' serves as intermediary gear for the servo-motor, or linking-up the adjacent cylinder. Without this adjusting device, the cylinder head becomes extremely simple, whereby the nozzle 97 may be placed closer toward the spark plug 20 and may then inject straight in direction of the admission duct 65. As a variant, a circular-, or an oval- rocking-piston is provided, whereby the exhaust slide valve 70 must run within the cylinder wall, or be three-dimensionally curved and guided. Also the piston with correspondingly formed cylinder chamber may have any suitable quadrangular form e.g. geometrically exact square form or rectangular form.

The two-stroke engine, as per FIGS. 11 and 12, is based on a modular kit, by which the volume of a singular cylinder and the number of cylinders may be varied. For this purpose, the engine casing consists of a right-hand cylinder wall 101 with air intake 102 and the left-hand cylinder wall 103, both of which are waisted inside (e.g. with an arc extending down to the crankshaft flange) and clamped together, in a sandwich manner, with the inside flat lateral walls 104 and 105. Sealing is achieved e.g. by adhesive foil, fastening by long expansion bolts 106, or corresponding rivets. These traverse preferably cast holes 107, respectively coolant cavities 108 and centering bushes 109, resulting in an even for cast-iron, light and simple structure. Another advantage is in the smallness of castings of great quantity with accurate gas scavenging ducts 110 and 111 and specially in simple machining of the waisted interior surfaces 112 and of the flat interior surfaces 113 with unobstructed tool run-out. Intake flange 114 and exhaust flange 115 are machined after assembly of the engine casing, since they spread over neighboring casing parts. Lateral walls 104 and 105 are either part of the front faces of the engine, or of a central casing between two cylinders and brace themselves, via cast webs 116, against opposite walls. This engine casing is closed below by crankcase 117 and above by the cylinder head 118, both of which are distinctly laid-out, in accordance with the number of cylinders and width of the cylinder walls 101 and 103.

The crankshaft 121 runs in plain bearings within the engine casing and is retained by the bearing caps 122, onto which the lower crankcase section 117 is also bolted. Its circular crank discs 123 extend laterally to the flat interior surfaces 113 of the lateral walls 104 and 105 and carry sealing rings 124, forming in conjunction with diagonally-split dished (belleville) springs 125, and oil return bores 126 an encapsulated forced feed-oil-lubrication for crank pins 127 and main bearings. For lubricating the rocking piston, leaking oil is sufficient.

The rectangular rocking piston 130 is cast in one piece with the cup-shaped connecting rod 131, e.g. in light alloy, and bolted together from above with the counterweight 133, e.g. consisting of heavy metal, by means of elongation-restraining anchor bolts 132, if necessary under insertion of a steel, or ceramics, piston crown 134. On their trajectory the connecting rod 131 and its counterweight 133, fill the gap between the crankcase inside 135 as thoroughly as possible and act thereby as an integrated connecting rod charger of simplest construction. The counterweight 133 is machined below, preferably cylindrically, and may feature for the improvement of the gap-seal fine transversal grooves 136, that may advantageously fade-out toward the edges. On the flat, lateral flanks of the connecting rod 131 and counterweight 133, sealing-strips may be disposed, between which the surfaces may be recessed to reduce friction. If the counterweight 137 is bolted-on from below, the bolt heads 138 may be covered e.g. by a segment 139 with less obtrusive central bolts 140. The connecting rod-trunk features, below the rocking piston 130, an inclined transversal wall 141 with a central supporting- and cooling-rib 142. During casting, the core of the casting void is supported via the lateral openings 143, obturated by the flat slide valve plates 144. These slide valve plates 144, made e.g. of stamped-out sheet metal, have their upper and lower rims disposed on concentric circles 145 and 146 and fit into corresponding recesses in the form of circular ring segments within the lateral connecting rod-surfaces, whereby the center of these circles lies preferably in the piston center 147. The lower extremities of slide valve plates 144 are bent to form gliding shoes 148, running in grooves 149 of the flat lateral walls 104 and 105 and keeping the slide valve plates 144 from following the pendular-motion of the connecting rod 131. Thereby the slots of the gas scavenging ducts 110 and 111 may be placed closer to the cylinder walls 112, i.e., may be widened, which is important for speedy gas exchanges. An electromagnetic gasoline injection nozzle 150 with air-shrouding from bores 151 in gas scavenging ducts 110, becomes optimally shielded from exhaust gases by the rocking piston 130.

The novel cylinder head 118 is characterized by an elongated, cylindrical combustion chamber 155, extending in perpendicular direction to the crank pin 127. On the intake side it is linked via a duct 156 and on the exhaust side via bores 157, or via a slot 158, to the cylinder chamber, whereby through tangential-, or alternatively through radial-dispositions of 156 and/or 157/158, an intake-swirl 159, a counter-swirl, or no swirl is generated in the combustion chamber 155. In the longitudinal axis of the combustion chamber 155 and forming its closure, are screwed-in on right-hand side a glow-plug 161 (or a spark plug) and on the left-hand side a hollow, or solid, glow-rod 162. Through variation of length and diameter of the glow-rod 162, the compression ratio may be adjusted, or altered. The cylinder-surface of the combustion chamber 155 and eventually of the glow-rod 162 is very thinly coated with platinum, or other catalyst, or e.g. lined with a replaceable, correspondingly coated plate-, or mesh-insert, to initiate the catalytic combustion.

The engine works as follows: The connecting rod-charger with bottom dead center 165 (connecting rod-axis tangential to crankcircle) and top dead center 166, aspires with its right-hand side unthrottled air via intake 102. Simultaneously the left-hand side presses previously aspired air via piston ducts 168 and piston ports 169 into the scavenging ducts 110. Through asymmetrical geometry of these ducts 110' (FIG. 12) relative to each other, an intake-swirl 170 is generated, that may be boosted and/or influenced in its three-dimensional position through shallow channels likewise asymmetrical in plan-view. Into this swirl 170 fuel is injected by the nozzle 150 and the fuel and air mixture is moved by the rocking piston 130 in direction of duct 156. During the same piston stroke, the combustion chamber 155 is scavenged with air through the bores 157, or the slot 158. As can be seen from piston crown position 134* at 330° crank angle, the fuel/air mixture is subsequently pushed through the duct 156 into the combustion chamber 155, where it enters into contact with the platinum coating, triggering an immediate catalytic self-ignition. Experience shows that a compression ratio of approximately 16:1 is sufficient to achieve ignition. When running with gasoline, a spark ignition installation should become dispensable and the glow-plug 161 needed for coldstarts only. At the end of the power stroke the rocking piston "tips" the exhaust gases into the lateral gas ducts 111, to which compressed air may be introduced from the connecting rod-charger, via short bores (not shown) for eventual after-burning, if needed under insertion of non-return valves.

Of great importance with the rocking-piston engine, as shown in FIGS. 11 and 12, is that the rocking piston 130 generates, through its pendular motion, an asymmetrical timing diagram for intake (dephased by connecting rod-charger and operated without diaphragm-valves, etc.), for scavenging and for exhaust, while its rectangular shape reduces to approximately 60% the interface-width between intake- and exhaust-gas, compared to a circular piston of equal piston surface. Further advantages are the integrated connecting rod-charger with big volumetric displacement and correspondingly thorough cylinder scavenging and charging, as well as the practically slap-, vibration- and friction-free running of the piston, as explained under FIG. 1. With the present engine, the body composed of rocking piston, connecting rod and counterweight constitutes the connecting rod-charger and the rocking piston of the combustion engine. With appropriate counterweights on the crankshaft, this body may be outstandingly balanced against external inertia forces, although its total mass is barely smaller than that of a corresponding trunk piston, including gudgeon-pin and connecting rod. The counterweight provision becomes considerable, this may in a multi-cylinder two-stroke engine however allow the use of a very small flywheel 177. For space reasons, the abovementioned crankshaft-counterweights must be placed outside the engine casing, on the flywheel 177 and on the opposite belt pulley, which is possible with any number of cylinders. With correspondingly widened central casings, however, counterweights may also fit inside, thus relieving the main-bearings.

FIG. 13 shows enlarged the left edge of the rocking piston 130 at top dead center during the power stroke. Its descent begins already at about 345° crankangle, while the needle, or roller 90, preferably made of ceramics, rolls under gas pressure on the waisted cylinder wall 112, as per arrow. This takes place with very little friction and wear on a gas-cushion, built-up behind and below the rolling body 90. The lateral, with respect to body 90, tangential sealing-strips 87, run also with little friction, due to their modest height (modest gas force), particularly if they are replaced by rotating needles. The sealing elements 87 and 90 are supported by a frontal strip 178, slideably guided in a frontal piston groove and applied by a leaf-, or undulating-spring 179. The right piston edge is conceived likewise, but there a harder spring 179 is earmarked to take-up the crank pin friction torque. The variant, as per FIG. 14, replaces the rolling body 90, by a sealing-strip 180 with an arched lip and the lateral sealing strips 181 touch if possible both cylinder walls 112, resulting in a better seal and avoiding gumming, on account of constant axial displacement. These sealing-strips 181 which extend from wall to wall also apply to FIG. 13. For the rest, the sealing-strips, as per FIGS. 7 and 8, are also suitable here. With large rocking pistons the sealing-strips 87/181 and the rolling bodies 90, must however be sectioned in length and the gaps made to mutually overlap, in order to compensate for heat expansion and wear.

As a variant to FIGS. 11 and 12, FIG. 15 shows a cylinder head, wherein the cylinder chamber is linked, via tangential duct 184 via radial duct 185, to the short, cylindrical and platinum-coated combustion chamber 186. Due to the pendular motion of the rocking piston 134* (shown at 330° crankangle) and to its ledge-shaped piston nose 188, catalytic self-ignition may be obtained by still simpler means. To be sure, the fuel-jet on the low-pressure injection-nozzle 150 should possibly not emerge axially, but perpendicularly to it (umbrella nozzle), in order to stay in the region of duct 185. The combustion chambers, as per FIGS. 11, 12 and 15, are suitable also for circular, or elliptical floating pistons. For example, as per FIGS. 5 and 6, but there the connecting rod-charger is then less effective. As a further variant, a four-stroke engine should be mentioned where the connecting rod-charger would have to feed into an air-box, leading to the intake valve.

In a further variant FIGS. 16 and 17 show in partial cross- and longitudinal-section a cylinder head of a gasoline engine with spark ignition, matching FIGS. 11 and 12. There the cylinder walls 101 and 103 are linked by an arched wall 190 to form one piece, encircling a combustion-chamber 191 of hemispherical likeness and forming a squeeze-gap, along line 192 extending to the left. This gap creates in combustion-chamber 191 an air-swirl, superposing itself, with 90° offset, to the scavenging air-swirl 170 (FIG. 12), imparting to the mixture optimal turbulence and a rapid ignition by the spark plug 20. This cylinder head 190 is also bore-cooled (closely-spaced coolant cavities 108 with traversing expansion bolts 106), wherein the engine oil may serve as coolant, gathering, after emerging from the crankshaft oil return-bores 126 (FIGS. 11 and 12 below), with upright engine position in channel 195, with extreme slant, in channel 197 and drained-off by pipes 196, or substantially larger ones. In a variant a separate cylinder head with interior structure, as per FIGS. 16 and 17, is interchangeable with head 118 in FIGS. 11 and 12. With gasoline injection, via nozzle 150 (or 97 in FIGS. 5 and 6), the throttle may be placed in not-shown, front-facing channels, that link gas channels 110 (scavenging-ducts) with the air intake 102, as a by-pass, whereby under part-load, or cylinder cut-off, the excess air pumped by the connecting rod-charger, is re-circulated in a loop with reduced losses.

From the engine, as per FIGS. 11 and 12, a compressor may be derived, by roughly doubling the piston width, by removing the gas slide valve plates 144 and the exhaust tract 111/115, by enlarging the intake duct 110 to 110" and substituting the cylinder head 118 by one with exhaust diaphragm-valves. Due to the connecting rod-charger a twin-stage compressor, without intake reed-valves (easily icing-over in the cold), is thus obtained in the most simple manner, lending itself e.g. as a heat pump, driven e.g. by a low-maintenance gas engine, as per FIGS. 11, 12, 16 and 17.

Ease maintenance is given to the described rocking-piston machines already due to their extreme simplicity. The few wear parts are easily replaced, e.g. in FIG. 1 the whole floating piston assembly 1-4 from below, while the crankshaft is 'in situ' and in FIGS. 5 and 6 the separate rocking piston 50 via the top. Due to the short screws 132', the piston crown 134 in FIGS. 11 and 12 may also be removed upwards, allowing the exchange of the majority of sealing elements. With the variant having anchor bolts 123, an assembly-screw 198 (FIG. 11 top right-hand) with a long knurled hand-grip 199 and constriction 200, into which engages a fork (slot) of angle iron 201, facilitating a fixation of the floating piston on the cylinder head-flange with subsequent uplifting, that may however also be done downwards, if accessible.

Remains to be added that the cylinder head 118 in FIGS. 11 and 12, may be run as a Diesel, provided the glow-rod 162 is replaced by a sufficiently long glow-plug and instead of the spark plug 161, a high-pressure injection-nozzle is fitted. Here too, the throttling of intake air, needed with cylinder head 16 and 17, is superfluous.

To utilize some of the exhaust gas energy, it is possible with engines, as per FIGS. 11 and 12 to pressurize the air intake 102 by a turbo-charger, whereby the connecting rod-charger works partly as a pneumatic (air) motor and through increased cylinder-scavenging and -charging, effective mean pressures of well over 10 bar become possible, also at high running speeds. As a variant, the crankshaft may be additionally driven by an exhaust-gas-turbine, via a silent reduction worm-gear and a freewheel, while speed-synchronizing shocks are taken-up by a viscous-clutch, placed between turbine and worm-gear.

I claim:

1. A reciprocating rocking-piston machine comprising:
    at least one cylinder forming a cylinder chamber and having a cylinder axis, a wall and a cylinder cover;
    a crank casing;
    a crank shaft rotatably supported in said crank casing and comprising at least one crank pin;
    a piston rigidly secured to integral with one end of a connecting rod and slidably received in said cylinder;
    a connecting rod bearing at the other end of said connecting rod for articulation of said rod to said crank pin;
    a counterweight at said other end of said connecting rod for increasing at least the mass of said other connecting rod end situated beyond the center of said connecting rod bearing, said counterweight being of such size and mass that the center of impact of this moving assembly with regard to the rocking piston center (2*, 147) substantially coincides with the center of the connecting rod bearing.

2. A rocking-piston machine in accordance with claim 1, as a two-stroke engine with a crankcase pump, wherein at least a portion of the crank case wall is formed in such a manner, that parts of the end face of the counterweight follow sealingly said crank case wall over a fraction of the crank angle and whereby in operation, said connecting rod and counterweight act as scoop-charger for increased charging said cylinder chamber.

3. A rocking-piston machine according to claim 1, wherein said machine is a four-stroke combustion engine having a slim connecting rod with a circular, oval or rectangular piston plate running in a waisted cylinder chamber and a cylinder cover with gas inlet and outlet means.

4. A rocking-piston machine according to claim 3, wherein said machine is a one-stage compressor.

5. A rocking-piston machine according to claim 1, wherein said connecting rod is composed of two halves bolted together, the halves enclosing a substantially hollow interior and abutting each other in a plane containing the crank pin axis and extending in the longitudinal direction of said connecting rod.

6. A rocking-piston machine according to claim 1, wherein the piston has a circular form with spherical running surface running in a circular cylindrical cylinder wall, said piston comprising a circumferentially extending sealing element, and wherein a number of serrations extend between the upper surface of the piston and the sealing element region in order to minimize lateral gas forces acting on the piston.

7. A rocking-piston machine in accordance with claim 1, wherein the piston has a quadrangular form with straight edges and comprises a piston seal having at least one element which at least at the inner side has an arcuate cross section, said element being received in a groove in the piston in such a manner that said element may swivel in said groove.

8. A rocking-piston machine according to claim 1, wherein the piston has a quadrangular form with straight edges and comprises a piston seal formed by a sealing element of cylindrical cross section, whereby under gas pressure existing in the cylinder chamber and acting on the side of the element away from the cylinder wall said element abuts sealingly on the cylinder wall and rolls on said wall during reciprocating movements of the piston.

9. A rocking-piston machine in accordance with claim 1, wherein the piston has the form of plate or disc removably secured to said connecting rod.

10. A rocking-piston machine according to claim 1, wherein said machine is a two-stroke combustion engine, and wherein an exhaust slide element is pivotably attached to the piston, said slide element being in gliding engagement with said cylinder wall containing an exhaust opening which in operation is intermittently covered by said slide element and intermittently opened to said cylinder chamber.

11. A rocking-piston in accordance with claim 1, wherein the machine is a compressed gas engine, and wherein said cylinder cover contains a gas inlet valve located eccentrically to the axis of said cylinder, said valve being actuable by an actuating means located on such a rim portion of said piston which is trailing during the upward stroke of the piston to produce an asymmetrical gas inlet relative to the piston top dead center (FIG. 3).

12. A rocking-piston machine according to claim 1, designed as a two-stroke engine with fuel injection, characterized in that the intake ducts (110, 110') are linked via flap-controlled frontal channels as a by-pass to the air intake (102) of the connecting rod charger, whereby at part load or cylinder cut-off the excess air of the charger is recirculated with reduced losses.

13. A rocking-piston machine in accordance to claim 1, wherein the bearing cap of said connection rod bearing forms part of the mass of the counterweight.

14. A rocking-piston machine according to claim 1, said machine being a two-stroke combustion engine having piston controlled openings in said cylinder wall to provide a gas inlet and a gas outlet, wherein said cylinder chamber has a quadrangular cross section forming two plane wall sections perpendicular to the rotation axis of said crankshaft, and two convex wall sections, said piston having a corresponding quadrangular face with four straight edges, said connecting rod having two plane parallel faces closely fitting between said plane cylinder wall sections, and at least one of said parallel faces containing a recess in which a slide valve plate is sealingly housed, said slide valve plate in operation intermittently covering such portions of inlet and/or outlet openings in the respective plane wall section which would get exposed due to the rocking movement of said piston.

15. A rocking-piston machine in accordance to claim 14, wherein said recess has the form of a circular ring segment, said slide valve plate being pivotably and sealingly supported on the circular portions of said ring segment, whereby in operation said slide valve plate pivots preferably about the rocking piston center and relative to said connecting rod during reciprocating movements of said piston.

16. A rocking-piston machine according to claim 15, wherein guide means guide said slide valve plate during reciprocating movements of the piston.

17. A rocking-piston machine in accordance with claim 14, wherein the cylinder walls have at least two scavenging ducts opening into the cylinder chamber in asymmetric manner under different angles in order to generate a swirl 170 of the air entering the cylinder chamber.

18. A rocking-piston machine in accordance with claim 1, wherein said cylinder chamber has a quadrangular cross section forming two plane parallel wall sections perpendicular to the rotating axis of the crankshaft and wherein said crank shaft comprises at least one circular crank disc, a plane crank pin side thereof lying in the same plane as the plane cylinder wall sections and in the same plane as extensions thereof which extend into the crank case to the bottom wall thereof, said rocking piston, said connecting rod and said counterweight having two plane parallel faces forming a sealing fit with said parallel cylinder wall sections and with said extensions and said continuing wall sections, whereby in operation said rocking piston, connecting rod and counterweight act as a volumetric pump organ for charging said cylinder chamber.

19. A rocking-piston machine in accordance with claim 18, having two convex wall sections situated each between said plane wall sections, wherein the front faces of the connecting rod have a concave form which, in the dead centers 165, 166 is complementary to the form of the adjacent convex cylinder wall section.

20. A rocking-piston machine in accordance with claim 19, wherein said convex wall sections extend to the flange of the crankcase.

21. A rocking-piston machine in accordance with claim 18, wherein the surface of the counterweight which during operation is in sealing interaction with a wall portion of the crank case comprises transverse grooves forming said sealing interaction.

22. A rocking-piston machine in accordance with claim 18, wherein said machine is an internal combustion engine and wherein a cylinder cover covering said cylinder contains a combustion cavity communicating with cylinder chamber, said cavity being of substantially circular cylindrical shape, the longitudinal extension of said cavity extending substantially perpendicularly to the axis of said cylinder and to the axis of said crank shaft, the communication between said cavity and said cylinder chamber being formed by at least two openings spaced apart in direction of the axis of said combustion cavity in order to generate an uniflow gas flow through said combustion cavity.

23. A rocking-piston machine according to claim 22, wherein one opening 156 serving during the upward stroke of the rocking piston as inlet from the cylinder chamber is situated on the side of the trailing portion of the rocking piston and substantially near the cylinder wall.

24. A rocking-piston machine in accordance with claim 23, wherein the combustion cavity is provided with fuel injection means arranged substantially near said inlet opening.

25. A rocking-piston machine in accordance with claim 23, wherein said inlet opening is directed in substantially tangential plane to the wall of said cylindrical combustion cavity.

26. A rocking-piston machine in accordance with claim 22, having a removable glow rod penetrating into said combustion cavity, said glow rod being replaceable in order to enable adjustment of the compression ratio.

27. A rocking-piston machine in accordance with claim 22, wherein at least a portion of the surfaces within said combustion cavity is provided with a catalyst for initiating catalytic combustion.

28. A rocking-piston machine in accordance with claim 27, wherein the surfaces provided with a catalyst are lined with replaceable catalyst coated elements.

29. A rocking piston machine in accordance with claim 18, wherein the piston has a quadrangular form with straight edges and comprises a piston seal having a rod element of substantially semi circular cross section, said rod element being retained in a cylindrical element having a cross section in form of a ring sector, said cylindrical element being retained in a semi-circular groove provided in the piston edge, whereby the rod element and the cylindrical element may swivel around their axis and with their edges follow sealingly the cylinder wall during rocking movements of the piston.

30. A rocking-piston machine in accordance with claim 29, wherein said cylindrical element is retained in at least one additional cylindrical element having a cross section in form of a ring segment.

1. A rocking-piston machine in accordance with claim 18, wherein the piston has a quadrangular form with straight edges and comprises a piston seal formed by a sealing needle rotatably retained within a tube sector which is retained within a groove provided in the piston edge, to produce a double gas seal.

32. A rocking-piston machine according to claim 18, wherein said machine is a two-stroke valve internal combustion engine with—due to the rocking motion of said piston—asymmetrical timing diagram for air intake, scavenging and exhaust, whereby the strokes of the rocking piston and of the connecting rod/counterweight charger as dephased.

33. A rocking-piston machine in accordance with claim 18, wherein said machine is a two-stage compressor, where said pump is the first stage and the space between the piston and the cylinder cover the second stage, with outlets in the cylinder cover comprising one or more check valves.

34. A rocking-piston machine in accordance with claim 33, wherein the gas transfer from the first stage to the second stage occurs through one or more openings 110″ situated in at least one of the plane wall section of the cylinder wall.

* * * * *